(12) United States Patent
Kurz et al.

(10) Patent No.: US 9,194,470 B2
(45) Date of Patent: Nov. 24, 2015

(54) NUT OF A PLANETARY ROLLER SCREW DRIVE, AND METHOD FOR PRODUCING SUCH A NUT

(75) Inventors: Michael Kurz, Bliesbruck (FR);
Dietmar Rudy, Kleinbundenbach (DE);
Rainer Kleber, St. Ingbert (DE);
Thomas Motz, Herzogenaurach (DE);
Horst Gredy, Oberreichenbach (DE);
Matthias Dohr, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 463 days.

(21) Appl. No.: 13/701,223

(22) PCT Filed: May 2, 2011

(86) PCT No.: PCT/EP2011/056898
§ 371 (c)(1),
(2), (4) Date: Nov. 30, 2012

(87) PCT Pub. No.: WO2011/154199
PCT Pub. Date: Dec. 15, 2011

(65) Prior Publication Data
US 2013/0068059 A1 Mar. 21, 2013

(30) Foreign Application Priority Data
Jun. 7, 2010 (DE) .......................... 10 2010 022 893

(51) Int. Cl.
*F16H 25/22* (2006.01)
(52) U.S. Cl.
CPC ....... *F16H 25/2252* (2013.01); *Y10T 74/19795* (2015.01)

(58) Field of Classification Search
CPC .................. F16H 25/2252; Y10T 74/19795
See application file for complete search history.

(56) References Cited

U.S. PATENT DOCUMENTS

| | | | | |
|---|---|---|---|---|
| 3,884,090 A * | 5/1975 | Dock | ........................ | 74/424.92 |
| 3,903,748 A * | 9/1975 | Krogsrud | ........................ | 74/25 |
| 4,037,893 A | 7/1977 | Perrin | | |
| 4,375,770 A * | 3/1983 | Druet | ........................ | 74/424.92 |
| 4,884,466 A | 12/1989 | Duruisseau | | |
| 5,370,012 A * | 12/1994 | Stanley | ........................ | 74/424.92 |
| 5,836,208 A * | 11/1998 | Dietrich et al. | ........................ | 74/424.92 |
| 6,170,351 B1 | 1/2001 | Zernickel | | |
| 7,000,495 B2 * | 2/2006 | Benoit | ........................ | 74/424.92 |
| 7,044,017 B2 * | 5/2006 | Cornelius et al. | ........................ | 74/424.88 |
| 8,020,463 B2 * | 9/2011 | Kinoshita et al. | ........................ | 74/424.92 |
| 8,082,818 B2 * | 12/2011 | Sugitani | ........................ | 74/424.91 |
| 8,312,784 B2 * | 11/2012 | Bonny | ........................ | 74/424 |
| 2010/0269616 A1 * | 10/2010 | Merlet et al. | ........................ | 74/424.92 |
| 2011/0072928 A1 * | 3/2011 | Seto et al. | ........................ | 74/424.92 |

FOREIGN PATENT DOCUMENTS

| | | |
|---|---|---|
| CH | 428337 | 7/1967 |
| CN | 87101219 | 7/1988 |

(Continued)

*Primary Examiner* — David M Fenstermacher
(74) *Attorney, Agent, or Firm* — Volpe and Koenig, P.C.

(57) ABSTRACT

A nut (1, 13, 21, 25) for a planetary roller screw drive is provided. A sleeve (14) which is produced by metal forming is provided, and two rings (16) that lie at a fixed distance with respect to each other in the axial direction are provided in this sleeve. In order to engage planets (3), the one ring (16) has the one groove profile (18), and the other ring (16) has the other groove profile (18).

10 Claims, 1 Drawing Sheet

(56) References Cited

FOREIGN PATENT DOCUMENTS

| | | |
|---|---|---|
| CN | 2628807 | 7/2004 |
| CN | 2662008 | 12/2004 |
| DE | 1043743 | 11/1958 |
| DE | 19646339 | 5/1998 |
| DE | 102008008013 | 10/2009 |
| EP | 0331761 | 9/1989 |
| GB | 699410 | 11/1953 |
| JP | 2007211922 A | 8/2007 |
| JP | 2009137734 A | 6/2009 |
| WO | 03048609 | 6/2003 |

\* cited by examiner

NUT OF A PLANETARY ROLLER SCREW DRIVE, AND METHOD FOR PRODUCING SUCH A NUT

BACKGROUND

The present invention relates to a nut of a planetary roller screw drive. In such planetary roller screw drives, a spindle nut is typically arranged on a threaded spindle, wherein planets that are arranged distributed around the periphery in an annular gap bounded by the spindle nut and the threaded spindle are in rolling engagement, on one side, with the threaded spindle and are in rolling engagement, on the other side, with the spindle nut. When the spindle nut and the threaded spindle are rotated relative to each other, this relative rotation is converted into an axial relative displacement between the threaded spindle and the spindle nut. In the axial directions, a positive-fit connection is established in planetary roller screw drives due to the rolling engagement of the planets. Without relative rotations between the spindle nut and the threaded spindle, no axial relative displacement is produced.

From DE 10 2008 008013 B3, for example, a planetary roller screw drive has become known with a nut that is provided on the inner periphery on each of its two axial ends with a groove profile, wherein planets on its two ends are also provided with groove profiles and wherein these planets engage with their groove profiles in the groove profiles of the nut.

The one groove profile formed on the nut for the one end of the planets and the other groove profile for the other end of the planets are formed on a common part of the nut and are thus arranged at a fixed distance relative to each other. This distance is tailored perfectly to the planets, so that the planets engage perfectly with their groove profiles provided on the ends in the groove profiles provided on the ends of the nut. The axial distance of the two groove profiles provided on the nut is fixed in such a nut; that is, it is not designed for a change in position of the two groove profiles relative to each other to be possible.

The groove profile in these known planetary roller screw drives or those according to the invention can consist of a plurality of grooves that are arranged one behind the other in the axial direction and have a closed annular shape on the peripheral side—as in the case of the publication noted above—and are arranged parallel to each other, wherein these grooves can lie in a plane that is arranged perpendicular to the axis of the planets and the axis of the nut. Two grooves that are arranged adjacent to each other can be bounded by a common groove connecting piece. In the rolling engagement of the planets with the nut, the groove connecting pieces of the planets engage in the grooves of the nut and the groove connecting pieces of the nut engage in the grooves of the planets. In other words: the groove profiles of the planets and of the nut engage in each other.

Between the two groove profiles of the nut there is an open space in which the planets engage with a radially enlarged middle section without contact to the nut. Such grooves can be produced, for example, in a metal-cutting process. Thus it is possible to produce both the groove profiles on the end and also the open space with a boring tool. However, such metal-cutting processing is complicated.

SUMMARY

The object of the invention is to provide a nut of a planetary roller screw drive that can be produced easily.

This object is met with the nut according to the invention. Numerous advantages are given because a sleeve is provided that is produced from sheet metal in a shaping process and in which there are two rings arranged at a fixed distance from each other in the axial direction, wherein the one ring has the one groove profile and the other ring has the other groove profile.

For one, metal-cutting processing can be largely or completely eliminated. For example, the rings can be provided with the groove profiles in a ring rolling method. On this ring, the groove profile extends over a partial width of the ring, wherein the entire width of the ring equals approximately 1.5 times this partial width or less. This means that a slightly smaller distance remains between the last groove of the groove profile and the adjacent edge of the ring. In this way it can be guaranteed that the material of the ring can flow adequately during the rolling.

The sleeve can likewise be produced in an economically favorable way from sheet metal, for example, in a deep-drawing process. Optionally, radial flanges can be formed on this sleeve, likewise in a non-metal-cutting shaping process. These radial flanges can be formed as support bearings for the two rings.

Nuts according to the invention are especially suitable for applications in which a receptacle borehole is provided for receiving the nut according to the invention. Such receptacle boreholes are typically formed in solid machine parts. Even if the sleeve of the nut according to the invention is formed from a very thin sheet metal and possibly does not have the necessary stiffness for trouble-free operation of the planetary roller screw drive, a trouble-free operation can nevertheless be guaranteed after the nut is inserted into the receptacle borehole, because the elastically deformable, thin-walled sleeve adapts to the contours of the receptacle borehole and takes advantage of the stiffness of the load-bearing machine part.

On the other hand, it is sufficient to arrange the two rings provided with the groove profiles in the sleeve and to position them relative to each other so that the fixed distance explained above with respect to the prior art is set between the two groove profiles, so that a trouble-free engagement of the planets with the nut is guaranteed.

The fixed distance can be achieved, for example, in one improvement according to the invention, in that a bearing pad is provided for each ring. This means that the two rings are supported in the axial direction on the associated bearing pads and are held in the fixed distance relative to each other, so that a trouble-free rolling of the planets on the nut is guaranteed. In the nut according to the invention, the two rings are arranged so that they cannot move relative to each other in the axial directions. An axial relative displacement between the rings is not provided.

The bearing pad can be formed in one improvement according to the invention by a spacer piece that is arranged between the two rings. In this case it can be sufficient to bring the two rings into contact on the ends of the spacer piece, in order to provide the mentioned fixed distance.

As a spacer there is, in particular, a spacer sleeve that is arranged in the annular space formed by the threaded spindle and the threaded nut.

In the case of the spacer sleeve, each of its end surfaces can be formed as bearing pads. In this case it can be preferable to guarantee that the two end surfaces are arranged perfectly planar and parallel to each other, so that this spacer sleeve can be arranged in an arbitrary rotational position in the sleeve.

For a perfect interplay of the rings with the bearing pads, one improvement according to the invention provides that the rings are provided on their ends turned toward each other with support surfaces for contact with the support bearings. The groove profile formed on the ring and the support surface are advantageously positioned relative to each other with very small tolerances, so that with the contact of the support surface on the allocated bearing pad, the fixed distance of the two rings relative to each other is set perfectly.

For a perfect positioning of the rings relative to each other, one improvement according to the invention provides that the sleeve is provided on each of its two ends with a radial flange that is formed in a non-cutting process and is directed inward in the radial direction. These radial flanges are consequently used as bearing pads for the rings.

A nut according to the invention can be produced in that the two rings are arranged in the sleeve so that the support surfaces of the rings contact the bearing pads provided between the two rings, wherein the one axial end of the sleeve projects past the adjacent ring in the axial direction. Now this projecting end of the sleeve can be shaped inward in the radial direction for forming the radial flange. In this improvement according to the invention, the two rings are positioned perfectly in the axial directions on the bearing pads provided between the two rings and also on the two radial flanges and held at a fixed axial direction relative to each other.

Instead of a separate spacer piece, one improvement according to the invention provides that the sleeve is provided on its inner periphery with bearing pads that are formed in a non-cutting process. These bearing pads can be rolled, for example, on the sleeve. It is sufficient to press the material of the sleeve inward, so that the bearing pads are provided on the inner periphery.

In this improvement according to the invention, it can be preferable when the sleeve is narrowed between the two rings by a ring section formed in a non-cutting process and projecting inward in the radial direction and whose two axial ends form bearing pads for the two rings.

In another improvement according to the invention, the two rings can each be provided on their outer periphery with a groove, in particular, a surrounding annular groove in which beads engage that are formed on the sleeve in a non-cutting process and extend inward in the radial direction. These beads consequently form bearing pads for the rings in two axial directions.

In this last variant, a nut according to the invention can be provided in an especially simple way: the two rings are arranged and held relative to each other in the sleeve with the provided axial distance, then the beads are formed in the sleeve and thus in the grooves of the rings. In this shaping process, material of the sleeve is forced into the grooves.

BRIEF DESCRIPTION OF THE DRAWINGS

Below, the invention will be explained in more detail with reference to three embodiments shown in a total of four figures, wherein

FIG. 4 a conventional planetary roller screw drive in a longitudinal section.

DETAILED DESCRIPTION OF THE PREFERRED EMBODIMENTS

Figure 4:
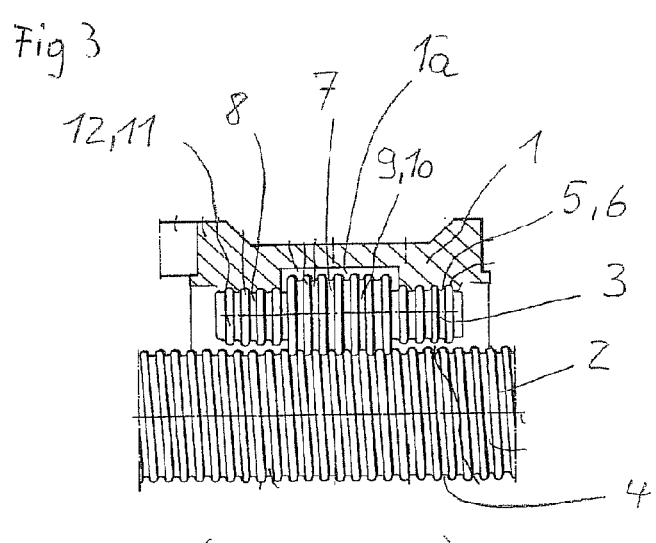
FIG. 4 shows a conventional planetary roller screw drive. Shown are.

With reference to FIG. 4, the construction of a conventional planetary roller screw drive will first be described as it is useful for the understanding of the invention.

In this planetary roller screw drive, a nut 1 is arranged on a threaded spindle 2 with planets 3 between these elements. The threaded spindle 2 is provided with a helical thread 4. The nut 1 is provided on its inner periphery with two groove profiles 5 that are each formed from a plurality of grooves 6. The grooves 6 have a closed annular shape and are arranged parallel to each other in a plane that is set perpendicular to the axis of the nut 1.

The planets 3 have a middle section 7 and also end sections 8 that are set off in the radial direction relative to the middle section 7 and placed on both axial sides of the middle section 6. The middle section 7 is provided on its outer periphery with a groove profile 9 that is formed from a plurality of grooves 10. The grooves 10 have a closed annular shape and are arranged parallel to each other in a plane that is set perpendicular to the axis of the planets 3. The two end sections 8 are each provided with a groove profile 11 on their outer periphery. These groove profiles are formed from a plurality of grooves 12. These grooves 12 have a closed annular shape and are arranged parallel to each other in a plane that is set perpendicular to the axis of the planets 3. The planets 3 and the nut 1 are in rolling engagement with each other with their groove profiles 5, 11.

An annular recess 1a that is arranged around the axis of the nut 1 is provided between the two groove profiles 11 of the nut 1. The planets 3 engage in this recess with the middle section 7 without contacting the nut 1.

The planets 3 engage with the groove profile 9 in the thread 4 of the threaded spindle 2. Under relative rotation between the nut 1 and the threaded spindle 2, the planets 3 rotate about the axis of the planets and about the axis of the threaded spindle.

Figure 1:
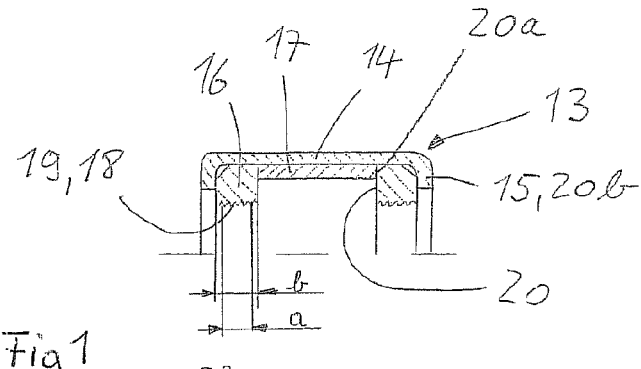
FIG. 1 a nut according to the invention in a longitudinal section.
Figure 2:
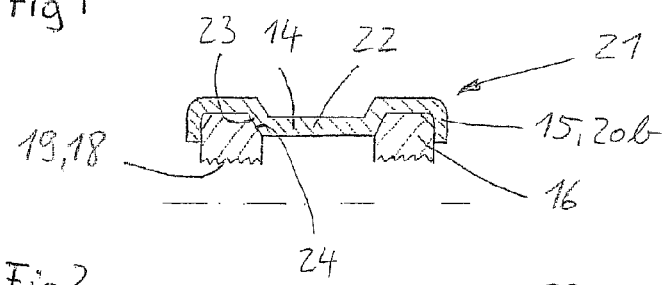
FIG. 2 another nut according to the invention in a longitudinal section.
Figure 3:
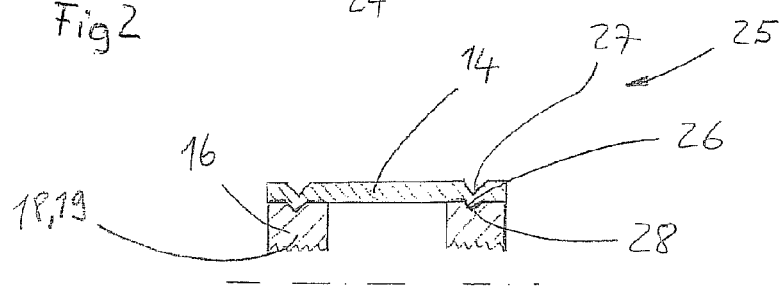
FIG. 3 another nut according to the invention in a longitudinal section.

The nuts according to the invention shown in FIGS. 1-3 can be used for planetary roller screw drives according to FIG. 4, wherein the nut 1 can be replaced by nuts according to the invention.

In the first embodiment according to the invention according to FIG. 1, a nut 13 is provided that has a sleeve 14 produced by a shaping process from thin-walled sheet metal and whose ends are each provided with a radial flange 15 directed inward in the radial direction. These radial flanges 15 are likewise formed in a non-cutting shaping process.

In the sleeve 14, two rings 16 are arranged one after the other in the axial direction with a spacer sleeve 17 between these rings. The two rings 16 are held without play in the embodiment between the spacer sleeve 17 and the adjacent radial flange 15. Each ring 16 is provided on its inner periphery with a groove profile 18. The groove profile 18 is formed by a plurality of grooves 19 that have a closed annular shape and are arranged parallel to each other in a plane that is set perpendicular to the axis of the nut 1.

On its sides turned toward each other, the two rings 16 are each provided with a support surface 20. These support surfaces are arranged parallel to each other in the embodiment and in a plane that is set perpendicular to the axis of the nut 1. The spacer sleeve 17 is formed on its ends as bearing pads 20a for the rings 16. In the embodiment, the rings 16 form a planar contact with their support surfaces 20 on the end surfaces of the spacer sleeve 17.

A ring width b of the ring 16 is at most 1.5 times a partial width a, wherein the partial width a indicates the axial extent of the groove profile 18. The groove profile 18 of the ring 16 is produced in the embodiment in a rolling process. The ratio of the ring width to the partial width described here allows a flow of the material of the ring 16 that is favorable for rolling processes.

The position of the groove profile 18 relative to the support surface 20 has tight tolerances. In the embodiment, a groove 19 of the groove profile 18 has tolerances in the axial direction with 1/100 mm precision relative to the support surface 20. For such high-precision rings, the spacer sleeve 17 can be provided with very tight axial tolerances, so that the nut 13 is ready for perfect engagement with the planets after installation of the individual parts.

In this embodiment, the nut 13 can be produced such that initially the sleeve 14 is provided on only one axial end with a radial flange 15. Then the two rings 16 can be inserted with the spacer sleeve 17 in-between into the sleeve from its open side. Then the parts of the sleeve 14 projecting in the axial direction can be shaped with a suitable tool into the radial flange 15, so that the nut 13 according to the invention is provided. The radial flanges 15 of the sleeve 10 form bearing pads 20b for the rings 16. In the embodiment, the rings 16 are positioned perfectly relative to each other by the bearing pads in both axial directions and are arranged at a fixed distance relative to each other.

The nut 21 according to the invention from FIG. 2 differs from the nut 13 from FIG. 1 essentially in that the spacer sleeve is replaced by a ring section 22 of the sleeve 14 narrowed in the radial direction. This ring section 22 can be rolled, e.g., with a rolling tool on the sleeve 14. In the embodiment, the two end sides of the ring section 22 are each formed as bearing pads 23 for the rings 16. In the embodiment, the bearing pad 23 is formed by a conical surface that is arranged at an angle to the axis of the nut. The two rings 16 are each provided on their end sides turned toward each other with a conical support surface 24 that forms a planar contact on the bearing pad 23.

This nut 21 according to the invention can be produced as follows: with knowledge of the exact dimensions of the two rings 16, the narrowed ring section 22 can be produced on the sleeve 14 by rolling. This rolling process is performed in that the two bearing pads 23 formed by the conical surfaces have a certain distance relative to each other. Now the two rings can be inserted from both axial sides into the sleeve 14 up to the bearing pads 23. Then the sections of the sleeve 14 projecting in the axial direction are shaped with a suitable tool into the radial flanges 15, so that the two rings 16 are arranged without play between the radial flanges 15 and the bearing pads 23.

The nut 25 according to the invention shown in FIG. 3 differs from the nut according to FIG. 2 by the following features: the two rings 16 are each provided on their outer periphery with an annular groove 26. The sleeve 14 is provided on its outer periphery with two beads 27 that have an annular shape and are formed in the sleeve 14 in a shaping process. Material of the sleeve 14 displaced by this shaping process engages in the annular grooves 26 of the rings 16, so that the two rings 16 are held perfectly on the sleeve 14 in the two axial directions. There are no radial flanges in this improvement according to the invention.

In this embodiment, the two rings 16 provided with the annular grooves 26 are inserted into the sleeve 14. With the help of a suitable gage, the two rings can be positioned relative to each other such that the provided fixed distance is guaranteed for a perfect engagement of the planets. In this position, the sleeve can be shaped with a suitable tool 14 such that the beads 27 are produced, wherein the displaced material of the sleeve 14 engages in the annular grooves 26 of the rings 16. The beads 27 formed in the annular grooves 26 form support pads 28 for the rings 16, so that the rings are arranged perfectly in the sleeve at a fixed distance relative to each other in the two axial directions.

The rings described in the embodiments can be strengthened in a metal-cutting turning process or can be ground in a metal-cutting process, wherein the groove profile can be produced by means of a typical ring rolling process. The rings can be produced favorably as precision blanks with respect to outer and inner diameters, wherein an inner diameter can be calibrated and wherein an outer diameter can be ground in a centerless process.

Especially in the embodiments according to FIGS. 1 and 2, modifications according to the invention are conceivable in which one of the two rings is arranged with axial play relative to the sleeve. In this way, planetary roller screw drives can be produced in which an exact positioning of the two rings relative to each other is produced only in the smaller periphery. This is because the ring with play can be shifted in its engagement position with the associated groove profile of the planet.

LIST OF REFERENCE NUMBERS

1 Nut
1a Recess
2 Threaded spindle
3 Planets
4 Thread
5 Groove profile
6 Groove
7 Middle section
8 End section
9 Groove profile
10 Groove
11 Groove profile
12 Groove
13 Nut
14 Sleeve
15 Radial flange
16 Ring
17 Spacer sleeve
18 Groove profile
19 Sleeve
20 Support surface
20a Bearing pad
20b Bearing pad
21 Nut
22 Ring section
23 Bearing pad
24 Support surface
25 Nut
26 Groove
27 Bead
28 Bearing pad

The invention claimed is:

1. Nut of a planetary roller screw drive, comprising a sleeve having an inner periphery upon which multiple planets arranged distributed around the inner periphery can roll with their two ends on groove profiles of the nut, wherein one of the groove profiles for the one end of the planets and the other of the groove profiles for the other end of the planets are arranged at a fixed distance relative to each other in an axial direction, the sleeve is produced from sheet metal by a shaping process and two rings are arranged in the sleeve at a fixed distance relative to each other in the axial direction, one of the rings has the one groove profile and the other of the rings has the other groove profile.

2. Nut according to claim 1, wherein a spacer piece is arranged between the two rings and axial ends of this spacer piece are formed as bearing pads for the rings.

3. Nut according to claim 2, wherein the rings are provided on ends thereof turned toward each other with support surfaces for contact with the bearing pads.

4. Nut according to claim 1, wherein the groove profile of the ring extends over a partial width (a) of the ring, wherein a ring width (b) is approximately 1.5 times the partial width (a) or less.

5. Nut according to claim 1, wherein the inner periphery of the sleeve is provided with bearing pads that are formed in a non-cutting process for the rings.

6. Nut according to claim 5, wherein the sleeve is provided between the two rings with a ring section that is formed in a non-cutting process and extends inward in a radial direction and includes two axial ends that form the bearing pads.

7. Nut according to claim 5, wherein the two rings are provided on each of their outer peripheries with a groove in which beads engage that are formed in a non-cutting process on the sleeve and extend inward in a radial direction.

8. Nut according to claim 5, wherein the sleeve is provided on two ends thereof with radial flanges that are formed in a non-cutting process and are directed inward in the radial direction.

9. Method for producing a nut according to claim 1, comprising the following steps: arranging the two rings in the sleeve, so that the support surfaces of the rings contact the bearing pads, the sleeve extending in the axial direction past the adjacent ring on at least one axial end, and shaping a projecting end of the sleeve inward in the radial direction for forming a radial flange.

10. Method for producing a nut comprising a sleeve having an inner periphery upon which multiple planets arranged distributed around the inner periphery can roll with their two ends on groove profiles of the nut, wherein one of the groove profiles for the one end of the planets and the other of the groove profiles for the other end of the planets are arranged at a fixed distance relative to each other in an axial direction, the sleeve is produced from sheet metal by a shaping process and two rings are arranged in the sleeve at a fixed distance relative to each other in the axial direction, one of the rings has the one groove profile and the other of the rings has the other groove profile, the method comprising the following steps: arranging and holding the rings in the sleeve at the fixed distance relative to each other, then forming beads in the sleeve and thus in grooves of the rings.

\* \* \* \* \*